United States Patent
Aronovitz

(10) Patent No.: US 6,738,470 B1
(45) Date of Patent: May 18, 2004

(54) DISTRIBUTED GATEWAY SYSTEM FOR TELEPHONE COMMUNICATIONS

(75) Inventor: David M. Aronovitz, Los Gatos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/561,752

(22) Filed: Apr. 29, 2000

(51) Int. Cl.[7] .......................... H04M 7/00; H04M 3/42; H04M 11/00
(52) U.S. Cl. ............................ 379/220.01; 379/209.01; 379/93.09; 709/220; 370/276
(58) Field of Search ................. 370/276; 379/220.01, 379/93.09, 209.01; 709/220

(56) References Cited

U.S. PATENT DOCUMENTS

| | | | | |
|---|---|---|---|---|
| 5,666,293 A | * | 9/1997 | Metz et al. .................. | 709/220 |
| 5,943,404 A | * | 8/1999 | Sansom et al. .......... | 379/93.06 |
| 6,169,795 B1 | * | 1/2001 | Dunn et al. ............ | 379/209.01 |
| 6,463,144 B1 | * | 10/2002 | Dunn et al. ............ | 379/210.01 |
| 6,483,903 B1 | * | 11/2002 | Itay et al. ................. | 379/93.01 |
| 6,584,078 B1 | * | 6/2003 | Betts ........................... | 370/276 |

* cited by examiner

Primary Examiner—Jack Chiang
Assistant Examiner—Thjuan P Knowlin
(74) Attorney, Agent, or Firm—Park, Vaughan & Fleming LLP

(57) ABSTRACT

A distributed system of gateways for establishing telephone communication connections between digital telephone service (e.g., DSL) subscribers and analog subscribers. A DSL subscriber's telephone connection includes digital and analog channels. In one method of operating the system, when a DSL subscriber initiates a telephone call to a party that is not a subscriber to the same service, the call is routed through a DSL Access Multiplexer to a digital network. A portal or directory server on the digital network determines that the called party is not a subscriber and therefore locates a "pass-through" subscriber served by the same central office as the called party. The portal routes the call to the pass-through subscriber, where the call is transferred from the digital channel of the subscriber's DSL connection to the analog channel. It is then directed back to the central office and switched over the local loop to the called party.

29 Claims, 4 Drawing Sheets

DISTRIBUTED GATEWAY SYSTEM FOR TELEPHONE COMMUNICATIONS

BACKGROUND

This invention relates to the field of communications. More particularly, a system and methods are provided for enabling telephone connections to be established between analog and digital telephone service subscribers without the use of a traditional analog/digital gateway.

Although the form of telephone communications is rapidly changing from analog to digital, the huge installed based of analog, or POTS (Plain Old Telephone System/Service), connections requires changes or evolutions in telephone communications to be compatible with POTS. The number of POTS subscribers far exceeds the number of digital subscribers, thus making it necessary to interface or transfer calls between the digital and analog systems.

Telephone communications are more and more often carried in digital form between central offices (CO), using both private and public (e.g., the Internet) digital networks, particularly for long distance calls. Most telephone calls still involve a conventional, analog, device at one end or the other; therefore at each end of the call, a telephone company's CO must be involved—either to receive the call from the local loop that serves the calling party or, at the other end, to place it on the local loop serving the called party.

Presently, in order to complete a call to an analog (POTS) subscriber, where the call was originated from a digital subscriber and/or carried to the called party's CO digitally, a central gateway must handle the call and translate it from digital to analog form. For example, voice over Internet services are quite popular and allow one POTS subscriber to talk to another without long-distance tolls. In particular, the voice communications are routed digitally (e.g., over the Internet), with a gateway at each end to convert the voice between analog and digital forms.

Gateways are typically located at central offices and may be responsible for the greatest portion of the cost of a long-distance telephone call. Even though a long-distance call can be carried very efficiently and cheaply over a digital network, the use of a central gateway to place the call into analog form or convert it from analog to digital form adds significant expense. Thus, until central gateways can be eliminated, the downward trend of long-distance telephone communications (and local calls that must be converted) is limited.

Digital Subscriber Line (DSL) technology is one form of digital telephone service that is quite popular. Even though DSL service can operate over the same physical local loops as POTS, it has a much higher bandwidth, thus allowing many more services to be offered to consumers and businesses. For example, in addition to traditional voice communications, DSL service providers can also offer increased bandwidth for data communications.

In a typical telephone call between a digital telephone service (e.g., DSL) subscriber and a POTS subscriber, a calling party having the digital service initiates a call in digital format over the local loop connecting the calling party to the local telephone company's central office. At the CO the call is received by a device configured for the digital service. For DSL, the call is received and processed by a DSLAM (DSL Access Multiplexer), which serves as a concentrator for calls involving DSL subscribers. From the DSLAM, the call is transferred to a digital network where a call server or directory server routes the call to the CO serving the called party. At the called party's CO, a central gateway receives the call, converts it to analog format and feeds it to a CO switch, which places it on the local loop for completion to the called party. Because the call must be processed by the central gateway, which is typically operated by an entity (e.g., the local telephone company) other than the calling party's digital service provider, the cost is higher than if would be if the digital service provider was able to complete the call without the gateway.

What is needed then is a system and method for enabling telephone communications to be conducted between digital and analog service subscribers without relying on a central gateway. What is also needed is a digital telephone device that is compatible with digital and analog forms of telephone calls. The digital telephone device may be capable of switching calls between the two forms. The device may also be capable of using one or the other form to place a call, depending on system status.

SUMMARY

In one embodiment of the invention a system and methods are provided for completing a telephone call between a digital telephone service (e.g., DSL) subscriber and an analog (e.g., POTS) subscriber without the intervention of a central gateway. Illustratively, the routing and completion of the call may be completely, or almost completely, under the control of the digital telephone service provider, thus allowing reduced cost for many local and long-distance telephone communications.

In this embodiment of the invention a DSL service subscriber uses a digital telephone device capable of conducting analog and digital telephone communications simultaneously. The subscriber's DSL connection to the central office (CO) (or other location at which the DSLAM that services the subscriber is located) includes a digital (i.e., DSL) portion, relatively high in bandwidth, and an analog portion having sufficient bandwidth to carry at least one analog call. In a normal mode of operation all of the subscriber's outgoing and incoming telephone calls are conducted over the digital portion of the subscriber's DSL connection. The subscriber normally has no access to the analog portion, which is controlled by the DSL service provider.

When the DSL subscriber places a call to a POTS subscriber, the call is made over the digital portion of the DSL connection to a DSLAM, which transfers the call to a digital network (which may be public, such as the Internet, or private). The call is received by a portal (e.g., a call server or communication server) configured to route telephone calls. The portal determines that the called party is not a subscriber to the digital service (e.g., DSL), or at least not a subscriber to the same digital service as the calling party. However, the portal identifies a digital subscriber served by the same central office as the called party and routes the call to a DSLAM serving that subscriber. This subscriber may be termed a "pass-through" subscriber.

The DSLAM routes the call, still in digital format, to the pass-through subscriber using the digital portion of the DSL connection. At the pass-through subscriber's digital telephone device, the call is received along with an instruction from the portal to the device to take the analog portion of the pass-through subscriber's DSL connection off-hook and dial the called party. The call is thus routed from the digital portion back out the analog portion of the pass-through subscriber's connection to the CO. At the CO the call is received as just another local analog call and is switched to the called party for completion. Any portion(s) of the call may be encrypted or otherwise secured to protect the privacy of the calling and/or called parties.

In one embodiment of the invention a digital telephone device is provided that acts as a limited (e.g., one line) gateway to facilitate the calling method described above. The configuration of the device, and the digital telephone service to which the pass-through party subscribes, prevent the party from accessing calls that pass through its device. The device includes software or firmware that is re-programmable through the DSL connection (e.g., from the portal).

In one embodiment of the invention the device also incorporates one or more subscriber line interface circuits (SLIC), which allow calls to be made over the analog portion of the DSL connection. The device may also incorporate a data port configured to allow a computing device to send and receive data communications.

In one embodiment the device incorporates the ability to fail over from using the digital portion of a DSL connection to the analog portion (e.g., to provide "life-line" service). The device may include a port for a handset and/or an analog telephone. If the digital telephone service fails or power for the digital service fails, the analog portion of the subscriber's DSL connection may be enabled so that the subscriber can at least conduct telephonic communications over the analog portion.

The digital telephone device may also include an LCD, LED or other display, a numeric (and/or alphabetic) keypad, a processor or controller to direct the operation of one or more components, a splitter or filter to divide the analog and digital portions of the DSL connection, a digital (e.g., DSL) modem and a power supply.

DETAILED DESCRIPTION

Figure 1:
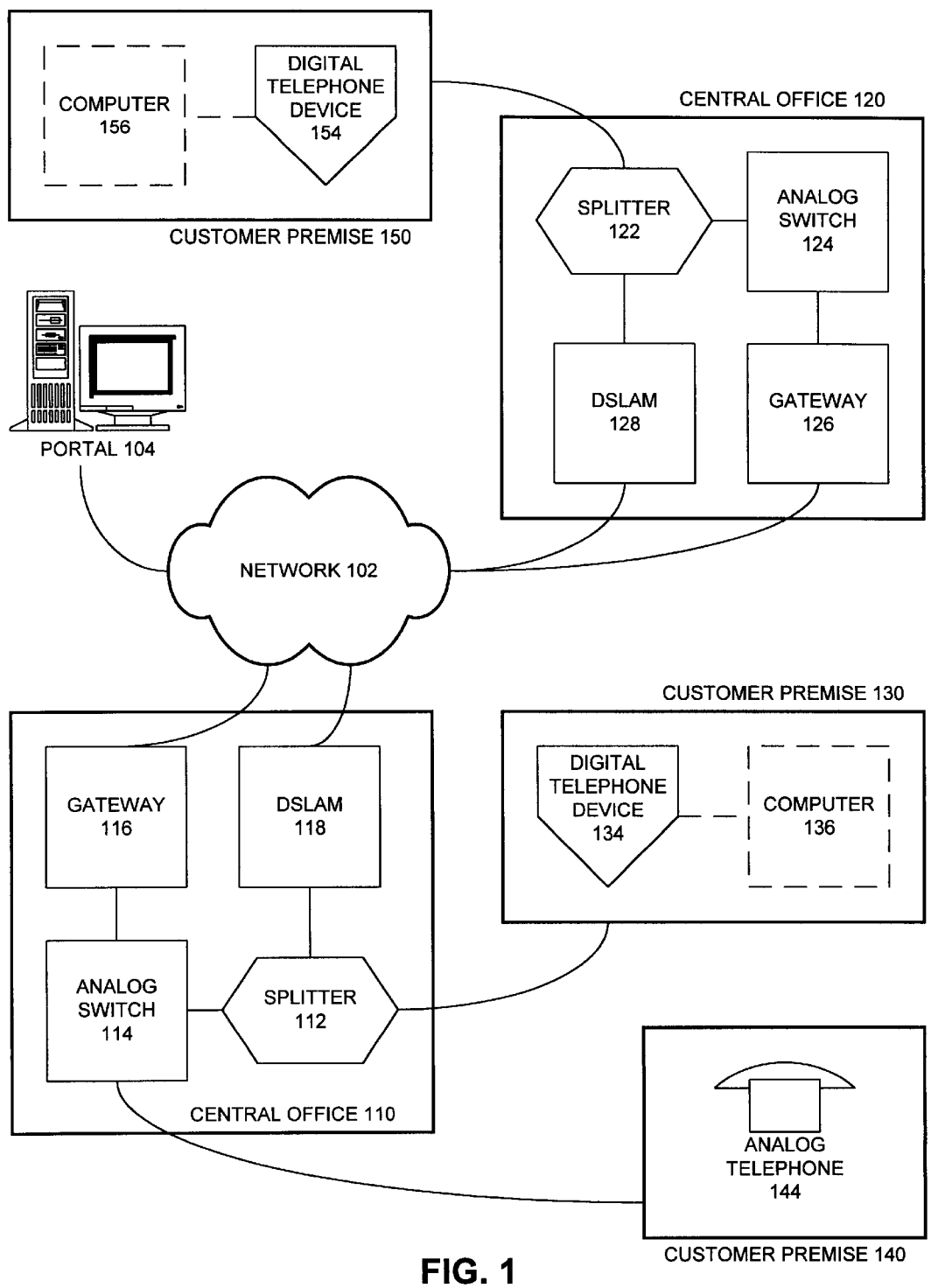
FIG. 1 is a block diagram depicting a distributed gateway system for telephone communications in accordance with one embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer or other processor-equipped communication device. Details of such devices (e.g., processor, memory, data storage, display) are well known and may be omitted for the sake of clarity.

It should also be understood that the techniques of the present invention might be implemented using a variety of technologies. For example, the methods described herein may be implemented in software executed by a processor, or implemented in hardware utilizing either a combination of microprocessors or other specially designed application specific integrated circuits, programmable logic devices, or various combinations thereof. In particular, methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In one embodiment of the invention a method is provided for establishing a telephone connection from a digital telephone service subscriber to an analog telephone service subscriber through a distributed system of limited gateways. The distributed nature of the system is distinctly different from the centralized architecture currently used for interfacing digital and analog telephone communications.

In this embodiment of the invention subscribers to a digital telephone service (e.g., Digital Subscriber Line (DSL)) use digital telephone devices to make and receive telephone calls or connections. When a connection is required between a digital service subscriber and an analog or POTS (Plain Old Telephone System or Service) subscriber, a digital connection is completed from the calling party to a pass-through subscriber in the destination party's local area (e.g., the pass-through subscriber and the destination party may be served by the same central office). From the pass-through subscriber's telephone device an analog connection is made to the destination party through the local telephone company's local loop and central office (CO). This method of connecting a digital subscriber to an analog subscriber may be used for long-distance as well as local calls.

This embodiment eliminates the need to route telephone connections between digital and analog subscribers through a central gateway (e.g., in a telephone company's central office) in order to access a long-distance digital link/network and/or convert a call between analog and digital formats. Each subscriber's digital telephone device is capable of establishing an analog connection through a central office while simultaneously maintaining a DSL connection.

Illustratively, the pass-through subscriber's telephone device is equipped to split an incoming DSL connection into its analog and digital portions or channels. In one normal mode of usage the pass-through subscriber makes telephone calls using the digital portion of the DSL connection. However, the device may be configured to use, or fail-over to, the analog portion if the digital portion is unusable or unavailable. In particular, in the event of a power failure the device may fail-over in order to take advantage of the life-line service of the analog portion, whereby electrical power is provided over the analog portion by the local telephone company.

Introduction

The form of telephonic communications (e.g., voice, data) is transitioning from analog to digital. In particular, many calls are routed or carried for long distances in digital format. However, the vast majority of telephone subscribers throughout the world have only analog telephones and service. There is thus a need to bridge the gap between the emerging digital form of telephone communications and the large installed base of analog equipment.

The analog form of telephone communications is often referred to as POTS (Plain Old Telephone System/Service) and is typified by analog telephones connected to a telephone company's central office.(CO) through a local loop. The bandwidth of POTS connections is relatively low, but is generally high enough for voice and limited amounts of data. As information needs continue to grow, requiring graphics, animation, sound and other complex or large sets of data to be communicated, it becomes very apparent that the analog telephone system cannot satisfy those needs.

One digital solution to the need for additional signal capacity is Digital Subscriber Line (DSL) technology. With DSL, the same physical link, or local loop, may be used between a customer premise (e.g., residence or business) and a CO, but the local loop now carries digital signals instead of, or in addition to, analog signals. The bandwidth of a DSL connection is typically much greater than an analog connection and may, for example, be able to digitally carry several telephone conversations simultaneously. Different types or "flavors" of DSL exist, collectively referred to as xDSL. For example, SDSL (Symmetric DSL) offers equivalent data rates in both directions (e.g., between a customer premise and a central office), ADSL (Asymmetric DSL) provides greater bandwidth or speed in one direction (e.g., to a residence or business), VDSL (Video DSL) provides data rates suitable for video data, etc.

The growth of digital telephone services and continued expansion of POTS further demonstrate the need to interface or convert between the two formats. The less expensively this can be accomplished, the cheaper long-distance and local telephone communications will become.

Besides the local loop that brings telephone service to a residence or business, POTS utilizes conventional CPE (customer premises equipment) such as the wiring within a home or business and the analog telephones used in the customer premise. In order to provide POTS, a telephone company maintains a central office that includes one or more switches for switching calls locally and/or to long-distance carriers. Presently, the telephone company or a third party also operates, typically at significant expense, a central gateway in order to convert analog calls from a local POTS subscriber to digital format for routing over a digital network (e.g., the Internet) and to convert digitally formatted calls from the network into analog format for the local POTS subscriber.

With DSL, much of the same equipment used in POTS may be retained, but additional equipment is required to take full advantage of its capabilities. In particular, when running one form of DSL over a local loop between a CO and a customer premise, each DSL connection comprises at least two channels or portions. One of these channels (e.g., the larger of the two as measured by bandwidth) carries digital signals, while the smaller channel is suitable for carrying an analog POTS signal. Thus, DSL and POTS can co-exist on a local loop. Splitters are typically employed at each end of the local loop to isolate or separate the two channels.

At the CO, calls from DSL subscribers are received over the digital channel in digital format and therefore are not handled through conventional, analog, switches to other central offices, long-distance links, LATAs, etc. Thus, after the digital signals are split off from the local loop or the analog portion of the subscriber's DSL connection, they are processed by a DSLAM (Digital Subscriber Line Access Multiplexer). A DSLAM is a device that multiplexes a subscriber's digital call onto a digital communication link or network, such as the Internet or a private network. The network carries the digital signals to another DSLAM (e.g., one that is local to the destination party).

By way of comparison, a pure POTS connection involves analog signals passing from a calling party to a called party through one or more analog switches at one or more central offices, while a pure DSL connection involves digital signals passing between the parties through DSLAMs and a digital network.

Increasingly, central offices are choosing to route even analog calls digitally. For example, calls that originate from an analog telephone and connect to the CO via POTS may be digitized and forwarded over a digital network; this can be very efficient for long-distance calls.

Existing systems for digitally routing POTS calls typically require a centrally located gateway or other similar piece of equipment (referred to herein as a gateway) to transfer or interface calls between analog and digital formats. In particular, a gateway is used to convert an analog call received at a CO from a local loop into digital form (e.g., for transmission or routing over the Internet or a private digital network), and vice versa.

A gateway is often located in a CO or connected to the CO via a high-capacity communication link (e.g., fiber). The cost associated with installing, operating and maintaining a gateway may serve as a barrier to continued reductions in the price to consumers of long-distance and even local telephone calls. Presently, every call established between a digital telephone service (e.g., DSL) subscriber and an analog telephone service subscriber must be processed by a gateway. If central gateways could be eliminated, this would be likely to significantly reduce the cost of making telephone calls between such parties.

A Distributed Telephone Gateway System

Therefore, in one embodiment of the invention a system and method are provided for establishing or facilitating a telephone connection from a calling party to a called party, wherein one party is a digital subscriber and the other is an analog subscriber, without the use of a centralized gateway to convert the connection from digital to analog or vice versa. One particular implementation of this embodiment is adapted for use with DSL technology. Although embodiments of the invention are described in which a digitally equipped caller calls an analog-equipped party, the reverse scenario is also contemplated.

The system according to one embodiment of the invention is thus capable of delivering a telephone call from a DSL subscriber to a destination party that subscribes only to POTS, not DSL. In this embodiment of the invention a distributed telephone gateway or switching system is created by configuring a DSL subscriber's digital telephone device to serve as a limited or mini-gateway capable of conducting a limited number of analog POTS connections (e.g., one) simultaneously with an active DSL connection. In particular, when a telephone connection is initiated from a digital service subscriber to a POTS subscriber, a digital stage of the connection is established between the calling party and a "pass-through" service subscriber. Illustratively, the pass-through subscriber is local to the called party (e.g., connected to the same CO as the called party). From the pass-through subscriber's device an analog stage of the connection is established through the pass-through subscriber's local loop to the CO, and back to the called party's analog telephone.

In this implementation the pass-through subscriber cannot normally access the analog channel or portion of their connection to the CO, which is used to establish the analog stage of the connection from the calling party to the called party. This helps ensure the privacy of the call. In one alternative embodiment of the invention a pass-through subscriber's analog portion of their connection to the CO is enabled if/when the digital telephone service, or power for the digital service, fails.

A following section describes a suitable digital telephone device for use in a distributed telephone switching system according to a present embodiment of the invention. The digital telephone device may, illustratively, be a stand-alone device for making telephonic connections, may be configured with a DSL modem to allow a computing device to send or receive data, may be incorporated into a computer system or other computing device, or take some other form. In addition, in one embodiment of the invention a digital telephone device is configured with a port for a conventional analog telephone that may be used in place of, or in addition to, a regular handset that can be used with the device.

A present embodiment of the invention is designed for DSL service subscribers. Illustratively, every telephone device used by the DSL subscribers may include the ability to carry a "pass-through" POTS connection. As stated, the design of DSL allows the two types of connections (i.e., POTS and DSL) to co-exist on a single physical link (e.g., local loop) between a customer premise and the CO. Typically, the upper (i.e., higher) frequency spectrum passed over the link comprises the digital signals of DSL while the analog signals of POTS are passed at lower frequencies. A splitter (or filter or other component performing a comparable function) is typically employed at the CO and a customer premise to separate the DSL and POTS signals. The splitter may be included in the digital telephone device used in a present embodiment of the invention. At the customer premise the digital channel may connect to a DSL modem to allow a computer to communicate at a high bandwidth. The analog channel, as already mentioned, is typically inaccessible to the DSL service subscriber, but is available for pass-through connections, and may be available to provide life-line service.

FIG. 1 depicts a distributed telephone gateway system according to one embodiment of the invention. The illustrated embodiment is configured to allow DSL telephone subscribers to complete calls to POTS subscribers without the intervention of a central gateway. Alternative embodiments of the invention may be configured for use with digital telephone services other than DSL and may take a form having any range of similarity with that of FIG. 1 without exceeding the scope of the invention.

In FIG. 1, digital network 102, which may comprise the Internet, a private network or other communication link configured to carry digital communications, routes signals (e.g., representing voice, data, etc.) in digital form between central offices 110, 120. Central offices 110, 120 may have any range of geographical separation between them. In the illustrated embodiment of the invention central office 110 serves customer premises 130, 140 while central office 120 serves customer premise 150. Also connected to digital network 102 is portal 104. In this embodiment portal 104 is a call server configured to route calls made by digital telephone service (e.g., DSL) subscribers. In particular, in this embodiment of the invention calls initiated by the subscriber are passed to digital network 102 as described below, where they are received at portal 104. Portal 104 then determines how and/or where (e.g., which central office, DSLAM or third party service provider equipment) to route the call to. Portal 104 may be coupled to network 102 via a CO, an ISP (Internet Service Provider) or other means.

CO 110 includes splitter 112, analog switch 114, gateway 116 and DSLAM 118. In the illustrated embodiment of the invention splitter 112 separates communications received from DSL subscribers' customer premises (e.g., customer premise 130) into their analog and digital channels and forwards the analog traffic, if any, to switch 114 and the digital portion to DSLAM 118. Splitter 112 also combines digital and analog signals and service for transmission to customer premise 130.

Switch 114 switches analog,(i.e., POTS) calls from and to POTS subscribers connected to the local loop. Customer premise 140 is one such POTS subscriber, whose telephone communications are made using analog telephone 144. Calls from/to local POTS subscribers that involve other central offices may be routed over digital network 102 through gateway 116, which converts the calls between analog and digital formats.

DSLAM 118 transfers DSL communications between digital network 102 and digitally subscribing customer premises served by CO 110. In one alternative embodiment of the invention DSLAM 118 is operated by a DSL service provider, which may not be the telephone company that maintains CO 110. In this alternative embodiment DSLAM 118 may be located elsewhere than CO 110, but still maintain a connection to digital network 102 and, through splitter 112 (which may also be located elsewhere than CO 110), switch 114.

In FIG. 1, customer premise 130 subscribes to a digital telephone service (e.g., DSL). Customer premise 130 includes digital or DSL telephone device 134 for establishing telephone connections. Device 134 may also be used to connect computer 136 to the high-speed DSL service. One embodiment of DSL telephone device 134 is described in detail in a following section. In the embodiment of the invention depicted in FIG. 1, device 134 includes a splitter, filter or other component configured to separate the DSL and analog channels of the subscriber's DSL connection to the CO.

Similar to central office 110, CO 120 includes splitter 122, switch 124, gateway 126 and DSLAM 128. Customer premise 150 includes DSL telephone device 154 and, possibly, computing device 156.

In the illustrated embodiment of the invention, the need for a central office gateway, such as gateway 116 is eliminated by distributing its digital/analog conversion function to DSL telephone devices (e.g., DSL telephone 134) used by DSL service subscribers. In this embodiment of the invention a DSL subscriber receives DSL service delivered over the telephone company's local loop. The internal telephone wiring of customer premises 130, 150 is linked to the digital channel of the subscribers' DSL connections. Thus, all calls to/from customer premises 130, 150 normally occur over the digital channel and the subscribers do not normally have access to the analog channels. Instead, and as described below, the analog portions of the subscribers' DSL connections are used to complete telephone calls to analog POTS telephones in the subscribers' local areas. The wiring of a customer premise may also carry a third channel, for a communication service such as HPNA (Home Phoneline Networking Alliance), which may, for example, allow voice and/or data to be networked or distributed about the premise.

Figure 2A:
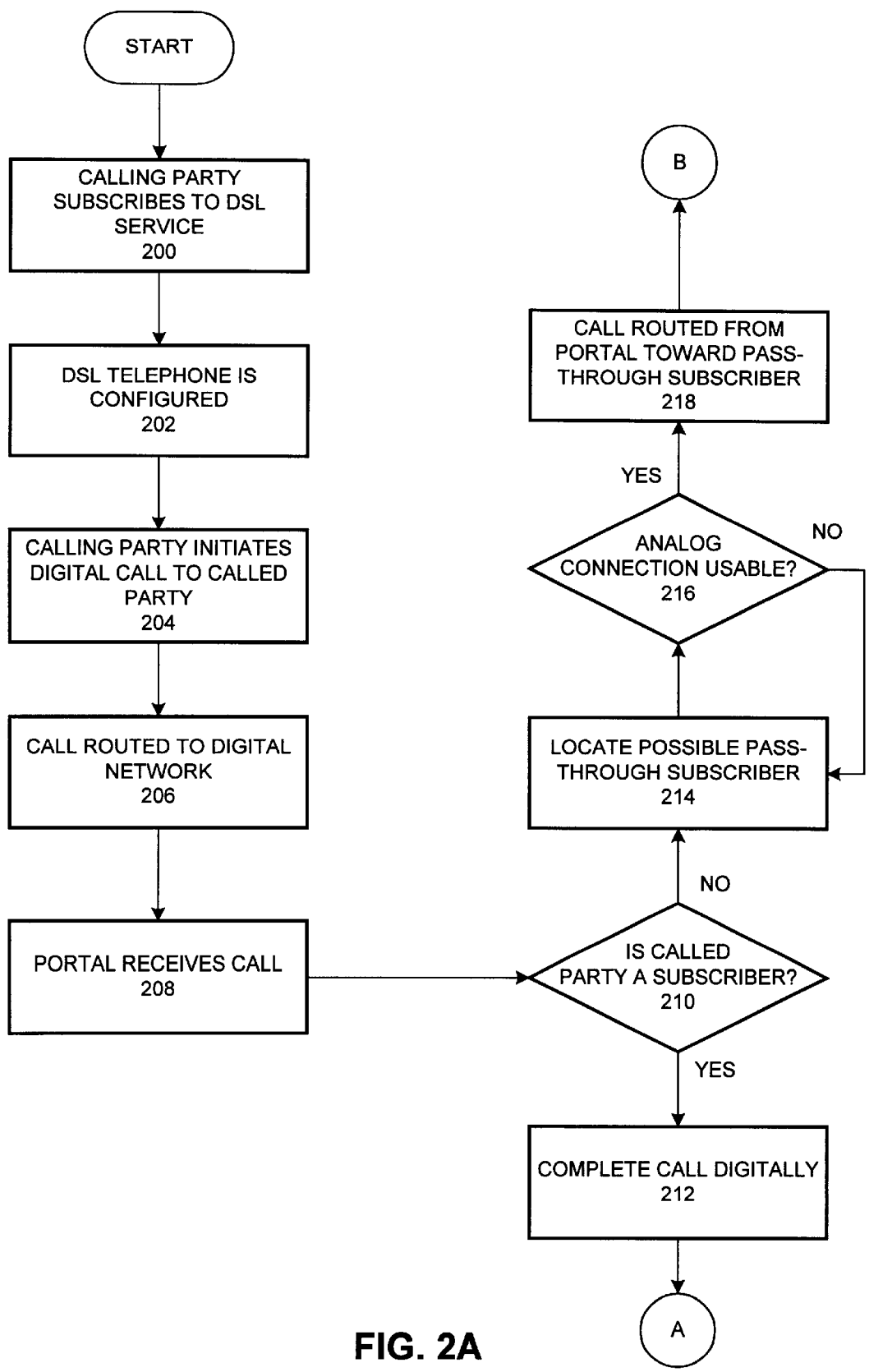
FIGS. 2A–2B comprise a flowchart illustrating one method of establishing a telephonic connection between a digital telephone service subscriber and an analog telephone service subscriber in accordance with an embodiment of the invention.
Figure 2B:
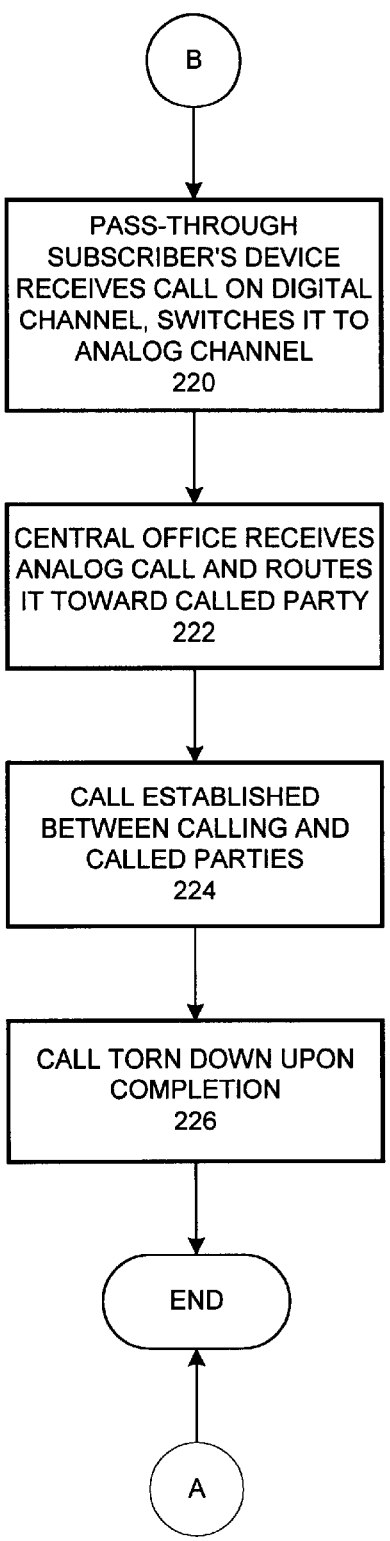

FIG. 2 depicts a procedure for establishing a telephone connection between customer premise 150 and customer premise 140 according to the embodiment of the invention depicted in FIG. 1. In the illustrated procedure a call from a digital telephone service (e.g., DSL) subscriber at customer premise 150 served by CO 120 to a non-subscriber (e.g., a POTS user) at customer premise 140 served by CO 110 is completed without requiring a central gateway such as gateway 116 or gateway 126. In this example, central offices 110, 120 may be geographically distant from each other (e.g., in different cities, states or countries). Alternative embodiments of the invention may be implemented where a call must be transferred to a POTS subscriber from a digital telephone service format other than DSL.

In state 200, the calling party subscribes to DSL service (or other digital telephone service) and a DSL telephone device is installed in customer premise 150. One suitable DSL telephone device is described in the following section.

The configuration of customer premise 150 may depend upon the service to which the calling party has subscribed. In the illustrated embodiment of the invention the DSL service operates over the same local loop to the customer premise and uses the same wiring within the premise as was used with POTS. The subscriber's DSL connection has two portions or channels. One, relatively high speed (e.g., measured by bandwidth) portion, carries digital (e.g., DSL) signals, which may be data and/or voice. The other portion provides at least one analog (POTS) voice channel between customer premise 150 and CO 120. In another implementation, however, a second telephone line may be installed between CO 120 and customer premise 150, with DSL service operating over one line and analog service over the other.

In normal telephone operations at customer premise 150, calls are normally made and received using the digital portion of the DSL connection to the CO. The link may be considered "owned" by the DSL service provider, which leases it to the subscriber. Therefore, the DSL service provider retains control over use of the analog portion of the DSL connection. For example, the internal wiring (e.g., telephone jacks, telephones) within customer premise 150 may be connected only, or normally, to the DSL portion of the link, while the POTS portion is connected to the DSL telephone device but generally cannot be used by the subscriber to make or receive POTS calls.

The analog portion may be used, in this embodiment, for making pass-through connections and/or for life-line service (e.g., in the event of power failure that affects use of the digital portion of a DSL connection).

Thus, it appears to the subscriber at customer premise 150 that only digital (e.g., DSL) service is available at the premise, even though an analog connection to the CO is available for use by the service provider and/or during emergencies.

The DSL telephone used to access the DSL service may be stand-alone (e.g., desk—or table-top) device. In such a configuration the DSL telephone device may be equipped with a single handset for making or receiving a call and/or a port to connect one or more analog telephones. The DSL telephone device may also have a data port (and possibly a DSL modem) so that a computing device may be interfaced to the DSL connection.

In one alternative embodiment of the invention the DSL telephone may be one of a number of DSL telephone devices installed at a customer premise. In such an embodiment a central splitter may be installed in the customer premise to separate the digital and analog channels of the DSL connection. Illustratively, each DSL telephone device may be connected to the digital channel. In another alternative embodiment of the invention a first DSL telephone device in customer premise 150 may incorporate a splitter to divide the digital and analog channels. Other telephone devices may then be connected to the digital channel from the first device. In yet another alternative embodiment the DSL connection with the CO may be coupled to each of multiple digital telephone devices, each of which includes a splitter for accessing one or more portions of the connection.

In state 202 the calling party's telephone device in customer premise 150 is configured. Illustratively, the use of DSL service, having increased bandwidth over POTS, allows a greater variety of services (e.g., multiple voice channels, higher data rates). Increased bandwidth for data connections is just one such service.

The calling party's DSL telephone device may be received pre-configured for use with the service. Or, as in the illustrated embodiment the subscriber may take action to configure or re-configure it or the device may be automatically configured or re-configured through the DSL connection. Thus, in this embodiment of the invention the DSL telephone device includes updateable software or firmware.

In order to configure or re-configure the device, a call or connection may be made from/to the device to/from a central server, such as portal 104 of FIG. 1. As described previously, such a call may be carried from customer premise 150 to CO 120 over the local loop. At the central-office, the call is transferred by DSLAM 128 to digital network 102, where it is routed to the server. Once connected to the server, a set of electronic instructions (e.g., software, firmware) for operating the device may be downloaded to the device. The downloaded instructions may be tailored to the specific device or type of device, as well as the service features to which the calling party has subscribed. In one alternative embodiment, digital telephone device 154 may be configured by computer 156. Illustratively, computer 156 may be connected to the device through a suitable port and may execute a series of instructions (which may be provided by the digital telephone service provider).

In state 204 the calling party initiates a call to the called, or destination, party at customer premise 140. The call may be placed from the calling party's DSL telephone device or from another telephone within premise 150, over the digital channel of the calling party's DSL connection.

In state 206, central office 120 receives the call from customer premise 150. Because the call is received through a DSL connection, the call is passed through splitter 122 to DSLAM 128. DSLAM 128 automatically routes the call through digital network 102 to a server (e.g., portal 104 of FIG. 1) configured to handle calls placed by DSL service subscribers. In an embodiment of the invention in which the DSLAM is not co-located with the telephone company's CO, the call is similarly routed in state 206 to the DSLAM and then to digital network 102 and server 104. However, the call may have to be routed through CO 120 if the calling party's DSL connection is so configured.

In state 208 the portal processes the call. In particular, in the illustrated procedure the portal identifies the called party in order to determine whether the called party subscribes to the same telephone service as the calling party or a service that is compatible.

In state 210 the portal determines whether the called party is a service subscriber. Illustratively, the portal may examine the called party's ANI (Automatic Number Indicator), or telephone number, and search a database for that number. If the called party is a subscriber, then the call can be completed digitally in state 212 (e.g., through digital network 102 to DSLAM 118 in CO 110, and over the local loop to the customer premise), after which the procedure ends. However, in the illustrated procedure the called party at customer premise 140 subscribes to POTS or other incompatible service and therefore the call cannot be completed digitally.

Thus, in state 214 the portal locates a service subscriber (e.g., customer premise 130) served by the same CO as the called party at customer premise 140. Depending upon the number of service subscribers, there may be a number of subscribers connected to the called party's CO. The selected subscriber may be termed a "pass-through" subscriber because the subscriber's DSL telephone device will be used to pass the calling party's call to the called party. Illustratively, every DSL telephone device, or at least one such device at every customer premise that subscribes to the service, is configured to enable a call to be passed through to non-subscriber.

In state 216 the portal determines whether the analog (i.e., POTS) portion of the selected subscriber's DSL connection to CO 110 is available. It was described above that the analog portion of this connection may be used to simultaneously carry a POTS call while the digital portion is in use. Because the analog portion is generally not accessible to the pass-through subscriber, use of this portion is controlled by the service provider (e.g., portal 104). Thus, portal 104 will keep track of which subscribers' analog lines are available and which are already being used for pass-through connections. Alternatively, portal 104 may interrogate or query DSL telephone device 134 at customer premise 130 to determine if it is capable of handling the pass-through call.

Portal 104 may also consider the status (e.g., activity level) of the pass-through subscriber's DSL connection. This may be necessary because the call must first be routed to the pass-through subscriber via the digital channel of the DSL connection with CO 110 before it can be routed back through the subscriber's analog channel. In particular, if one subscriber's DSL connection is being fully, or nearly fully, utilized (e.g., for a high-speed data transfer, for multiple voice connections), then the portal may choose another subscriber for the pass-through connection.

If the analog connection of DSL telephone device 134 is not available or not a good candidate, then the illustrated procedure returns to state 214 to select a different pass-through subscriber. If the device is available, then the portal updates its data to indicate that the analog portion of the pass-through subscriber's device is in use, and the procedure continues at state 218. Also, the portal may issue a command to DSL telephone device 134 to take its analog channel off-hook and dial, or prepare to dial, the called party's telephone number.

In state 218 the call is forwarded to CO 110, which serves both the called party (at customer premise 140) and the pass-through subscriber (at customer premise 130). Within CO 110, DSLAM 118 receives the call from digital network 102 for routing through the local loop to customer premise 130. In an alternative embodiment of the invention in which DSLAM 118 is not co-located with CO 110, in state 218 the call is still received at the DSLAM and routed toward customer premise 130, possibly requiring routing to/through CO 110.

In state 220 the call is received at the pass-through subscriber's DSL telephone device over the subscriber's DSL connection from CO 110. The call is then transferred onto the analog portion of the subscriber's link to the CO and sent back to CO 110 in analog form. Illustratively, a subscriber line interface circuit (SLIC) in the DSL telephone device allows it to switch a call from the digital channel of the DSL connection to the analog channel. The SLIC may provide such telephonic features as dial tone, DTMF (dual-tone multi-frequency) signaling, tip ring, etc. A processor within the device is configured to recognize commands from the portal to initiate and terminate analog calls, re-configure the device, provide status information, etc.

In state 222 the call is received at CO 110 through splitter 112, and appears to be an ordinary POTS call from customer premise 130 to customer premise 140. The call is routed to switch 114 where the called party's number is examined and the call transferred onto the local loop to customer premise 140.

In state 224 the call is received at customer premise 140 and answered at telephone 144. When the call is completed (e.g., the calling and/or called parties place their telephones on-hook), the call is torn down in state 226. In particular, the connection through the pass-through subscriber is dropped and the portal updates its status concerning availability of customer premise 130 as a pass-through subscriber. A processor or controller in telephone device 134 may, for example, inform portal 104 that its analog channel is now on-hook.

The procedure illustrated in FIG. 2 is one method of implementing a distributed system of telephone gateways to replace centralized gateways in converting calls between digital and analog formats. Other methods may be derived from the illustrated procedure and preceding description without exceeding the scope of the invention.

A Digital Telephone Device According to One Embodiment of the Invention

In one embodiment of the invention a digital telephone device is provided for use in a distributed system of telephone gateways. In this distributed system, the digital telephone device may serve as a limited gateway for interfacing or transferring a telephone connection between digital (e.g., DSL) and analog (e.g., POTS) formats. The device described in this section is configured for use with DSL service but maybe modified for use with other digital telephone services now existing or hereafter developed.

Figure 3:
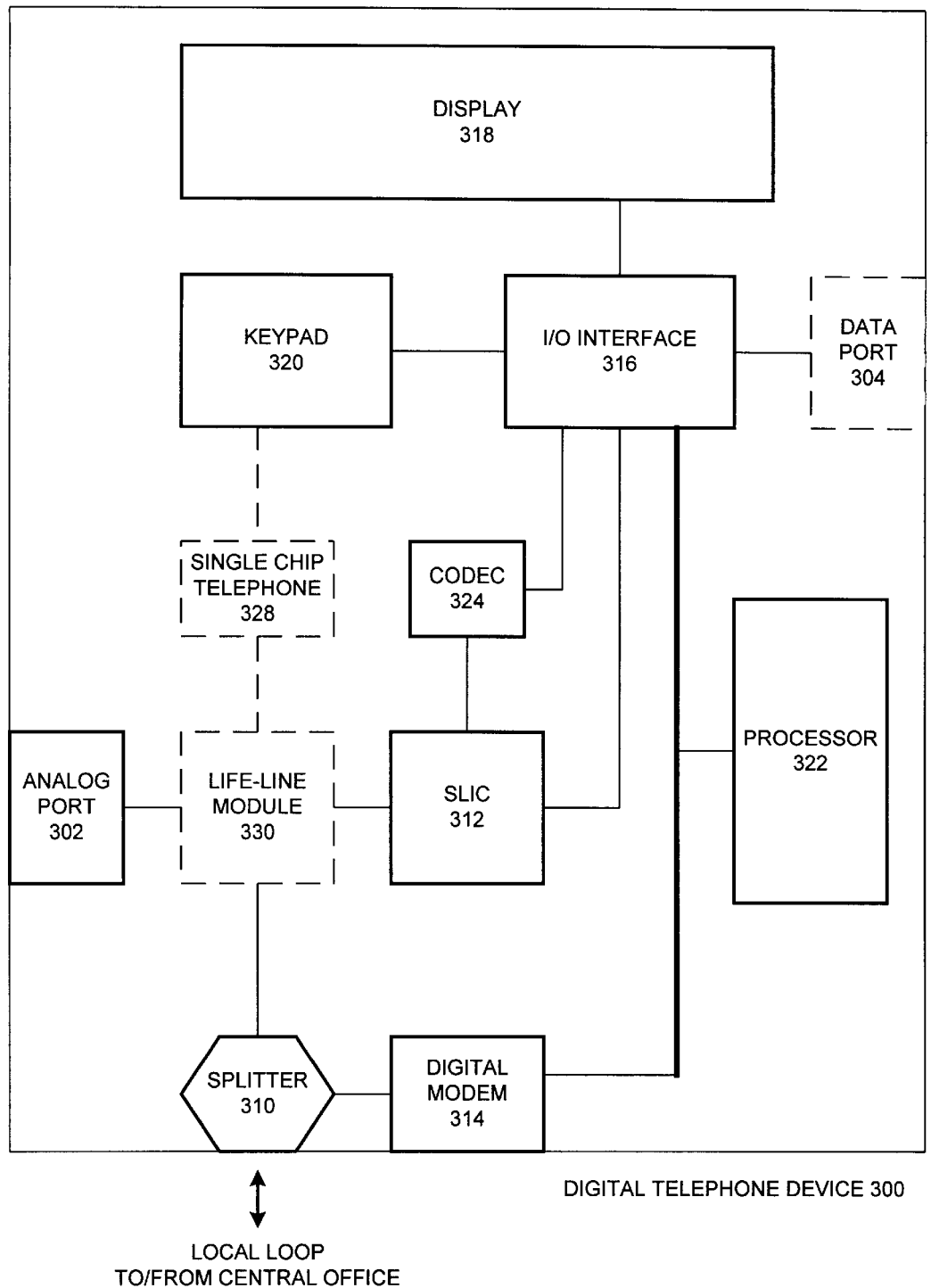
FIG. 3 is a block diagram of an illustrative digital telephone device suitable for use with the distributed gateway system for telephone communications depicted in FIG. 1.

FIG. 3 is a diagram of one form of a digital telephone device (e.g., device 134 of FIG. 1) according to a present embodiment of the invention. The illustrated device 300 may be implemented as a stand-alone unit. Alternatively, the depicted device may be readily modified for incorporation into another piece of electronic equipment, such as a computer.

In FIG. 3, digital (e.g., DSL) telephone device 300 includes analog port 302, which is configured to accept a connection from a handset and/or a standard POTS telephone. Thus, port 302 may comprise an RJ-11 port or other suitable wiring connection. Optional data port 304 enables telephone device 300 to be connected to a data device (e.g., a computer, a peripheral device, another digital telephone device). In one implementation, data port 304 may comprise a USB (Universal Serial Bus), serial, parallel, Ethernet or other port.

Splitter 310 connects device 300 to the subscriber's DSL connection and a central office (e.g., through the subscriber's local loop). The splitter divides the DSL connection into its constituent digital (e.g., DSL) and analog channels or portions. The analog channel of the connection is fed to analog port 302, subscriber line interface circuit (SLIC) 312, and optional life-line module 330. SLIC 312 provides traditional analog telephone functions such as dial tone, DTMF (dual-tone multi-frequency) coding/decoding, on-hook and off-hook detection, tip ring, etc. Illustratively, SLIC 312 enables device 300 to place a call over the analog channel of the local loop connection, as described in a previous section, at the same time the digital (e.g., DSL) channel is in use.

The digital channel or portion of the DSL connection passes through splitter 310 (which may be a filter or similar element) to digital (e.g., DSL) modem 314. One function of DSL modem 314 is to translate or transfer outgoing signals (e.g., voice, data) for digital transmission over the local loop to the CO, DSLAM and digital network, and vice versa. In particular, the DSL modem is configured to establish a connection to a portal or server on the digital network to initiate or route a digital call, re-configure device 300, download new or updated operating instructions, etc. Modem 314 is also configured to transform an incoming (e.g., DSL) signal, as necessary, for use by processor 322, interface 316, etc.

Input/output interface 316 is configured to control input and/or output components of device 300. In particular, interface or driver 316 may control display 318, which may be a LCD (Liquid Crystal Display), LED (Light-Emitting Diode) or other output device. In one particular embodiment, display 318 may comprise or occupy a portion of a computer display. Display 318 may be used to show an incoming or outgoing telephone number, a status of device 300, other information (e.g., textual or graphical) associated with service features received by the subscriber, etc.

Interface 316 may receive input from keypad 320, which may be used to input destination telephone numbers, make service choices, or input other information. Interface 316 may be further configured to control data port 304 (e.g., to handle data traffic to/from a peripheral device).

Processor or controller 322 is configured to execute instructions for operating device 300 and/or one or more of its components (e.g., SLIC 312, modem 314, interface 316, codec 324). Processor 322 may include or have access to memory resources of various forms (not shown in FIG. 3), such as a boot module, RAM, flash memory, etc. Such memory may be shared with other components of device 300 or multiple memories may be included in the device for use by the various components.

Coder/decoder (codec) 324 is included in digital telephone device 300 to convert signals from digital to analog and vice versa. Illustratively, codec 324 may be coupled to a microphone or other input device and as a speaker or other output device. For example, the microphone and speaker may be part of, or connected to, the user's computer system. The computer system may incorporate the digital telephone device or be coupled to it (e.g., through port 304).

In a typical implementation of digital telephone device 300, a handset or analog telephone is plugged into analog port 302. When a user picks up the handset to make a call, SLIC 312 detects the off-hook condition, provides dial-tone to the handset and notifies processor 322. The SLIC then detects the DTMF codes entered by the user via keypad 320 (or analog telephone) and feeds them to the processor. The processor then initiates a connection to portal 104 (shown in FIG. 1) through modem 314, splitter 310, the digital portion of the subscriber's local loop DSL connection and the DSLAM at the other end of the DSL connection. The portal determines where the call is directed and identifies (e.g., via IP (Internet Protocol) address) a compatible digital telephone device in the destination area. Voice signals from an analog handset or telephone are digitized by codec 324 for handling and routing by processor 322 and modem 314. In an embodiment of the invention in which DSL telephone device 300 is coupled to a computer, the device may receive dialing instructions and/or voice input from the computer (e.g., via a microphone coupled to codec 324).

When a call is received at digital telephone device 300 via the digital channel of the DSL connection, processor 322 instructs SLIC 312 to ring the handset or other communication device (e.g., analog telephone, computer). Identification of the calling party may be shown on display 318. When the handset is taken off-hook, the SLIC detects this condition and passes the decoded voice signal to the handset, through codec 324. Incoming text, graphics or other non-audio signals may be passed to display 318 and/or data port 304. Memory resources within device 300 may be used to store various information concerning answered and unanswered calls, as well as electronic mail and other digitally deliverable information and data.

When digital telephone device 300 is used in a "pass-through" manner as described in the preceding section, the pass-through call is received at processor 322 through splitter 310 and modem 314. The processor identifies the call as a pass-through call (e.g., the call may include instructions from portal 104) and thereby recognizes the need to transfer the call to the analog channel of the DSL connection rather than complete the call as normal. Thus, SLIC 312 is directed to take the analog channel off-hook and dial the local number of the analog-equipped destination party. After the destination party answers, the digital voice received by the processor is converted to analog by codec 324, passed through SLIC 312 and over the analog channel of the DSL connection.

In one embodiment of the invention life-line module 330 is configured to ensure telephone service availability in the event of electrical power failure. Life-line module 330 may incorporate a battery, relay or other such component. In the event that the AC power of the customer premise or digital telephone device 300 fails, module 330 allows calls to be placed using the analog portion of the customer's local loop. More specifically, if the digital channel becomes unusable, life-line module 330 connects a handset or analog telephone connected to port 302 to the analog channel through splitter 310. Sufficient power for placing a call is then received over the analog channel from the CO.

In one alternative embodiment of the invention the digital telephone device includes single chip telephone 328. The single chip telephone allows POTS calls to be made using the life-line service of the CO without having a regular analog telephone connected to port 302. In particular, calls can be dialed using keypad 320 (or voice input through codec 324) and audio provided to the caller through a handset connected to port 302, a speaker included in device 300 (not pictured in FIG. 3) or a speaker coupled to codec 324. As described above, power is received over the analog portion of the DSL connection from the CO.

In yet another alternative embodiment of the invention digital telephone device 300 provides HPNA (Home Phoneline Networking Alliance) services to the customer premise. In particular, HPNA is configured to operate at frequencies slightly higher than DSL, but within the processing capabilities of device 300. In this alternative embodiment the HPNA allows a number of computing devices to be networked and access the high data rates available through the DSL connection. Thus, the existing telephone jacks and wiring in the customer premise may be used for data networking as well as voice communications.

In another alternative embodiment of the invention digital telephone device 300 may be used with conventional analog telephone service until a digital telephone service (e.g., DSL) is installed or enabled. In this alternative embodiment the device could not operate as a gateway until the digital service is enabled, but it would allow regular voice communications and, through modem 314, data communications as well. Advantageously, as soon as digital telephone service is initiated, processor 322 would recognize the service and re-configure the device as necessary (e.g., by contacting portal 104).

The foregoing descriptions of embodiments of the invention have been presented for purposes of illustration and description only. They are not intended to be exhaustive or to limit the invention to the forms disclosed. Many modifications and variations will be apparent to practitioners skilled in the art. Accordingly, the above disclosure is not intended to limit the invention; the scope of the invention is defined by the appended claims.

What is claimed is:

1. A method of establishing a telephone connection from a digital telephone service subscriber to an analog telephone service subscriber, wherein the telephone connection is converted from analog to digital form without a central gateway, the method comprising:
   receiving at a call server a telephone call from a first digital telephone service subscriber using a first digital telephone device;
   determining whether a destination party of said telephone call is a digital telephone service subscriber;
   identifying a second digital telephone service subscriber having a second digital telephone device connected through an analog channel of said second subscriber's telephone service to an analog telephone service provider supplying analog telephone service to said destination party; and
   routing said telephone call to said second digital telephone device through a digital channel of said second subscriber's telephone service, after which said telephone call is transferred to said analog channel and routed to said analog telephone service provider for completion to said destination party.

2. The method of claim 1, further comprising:
   establishing a connection between said first digital telephone device and said call server; and
   updating said first digital telephone device via said connection between said first digital telephone device and said call server.

3. The method of claim 1, wherein said determining comprises searching a database for a telephone number of said destination party.

4. The method of claim 1, wherein said telephone call is a local call and said first subscriber comprises said second subscriber.

5. The method of claim 4, wherein said telephone call is initiated by said first digital telephone device over a digital channel of said first subscriber's digital telephone service, further comprising:
   issuing a command from said call server to said first digital telephone device to re-initiate said telephone call on an analog channel of said first subscriber's telephone service.

6. The method of claim 1, wherein said identifying comprises determining whether said analog channel of said second subscriber's telephone service can be used for delivering said telephone call to said destination party.

7. The method of claim 1, wherein said identifying comprises determining whether said digital channel of said second subscriber's telephone service can be used for delivering said telephone call to said second digital telephone device.

8. A method of converting a digital telephone call for completion to an analog telephone service subscriber without a central gateway, comprising:
   at a first digital telephone service subscriber's telephone device, initiating a telephone call over a digital portion of said first subscriber's telephone connection;
   receiving said telephone call at a communication server of a communication network configured to transmit telephone calls digitally;
   determining whether a destination party of said telephone call subscribes to a digital telephone service;
   identifying a pass-through digital telephone service subscriber served by the same analog telephone service provider as said destination party;
   routing said telephone call to said pass-through digital telephone service subscriber's telephone device over a digital portion of said pass-through subscriber's telephone connection; and
   at said pass-through telephone device, transferring said telephone call over an analog portion of said pass-through subscriber's telephone connection;
   wherein said telephone call is switched to said destination party by said analog telephone service provider.

9. The method of claim 8, wherein said first telephone device is configured by said communication server through said digital portion of said first subscriber's telephone connection.

10. The method of claim 8, wherein said identifying comprises determining whether said analog portion of said pass-through subscriber's telephone connection is available.

11. The method of claim 8, wherein said identifying comprises determining whether said digital portion of said pass-through subscriber's telephone connection is available.

12. The method of claim 8, further comprising issuing a command from said communication server to said pass-through telephone device to take said analog portion of said pass-through subscriber's telephone connection off-hook.

13. The method of claim 8, wherein said digital telephone service is Digital Subscriber Line telephone service.

14. The method of claim 8, wherein said telephone call from said first subscriber to said destination party is a long-distance call.

15. The method of claim 8, wherein said telephone call from said first subscriber to said destination party is a local call.

16. The method of claim 15, wherein said first subscriber is said pass-through subscriber.

17. The method of claim 8, wherein said pass-through digital telephone service subscriber cannot access said analog portion of said pass-through subscriber's telephone connection in a normal mode of operation of said pass-through telephone device.

18. A computer readable storage medium storing instructions that, when executed by a computer, cause the computer to perform a method of converting a digital telephone call for completion to an analog telephone service subscriber without a central gateway, the method comprising:
   at a first digital telephone service subscriber's telephone device, initiating a telephone call over a digital portion of said first subscriber's telephone connection;

receiving said telephone call at a communication server of a communication network configured to transmit telephone calls digitally;

determining whether a destination party of said telephone call subscribes to a digital telephone service;

identifying a pass-through digital telephone service subscriber served by the same analog telephone service provider as said destination party;

routing said telephone call to said pass-through digital telephone service subscriber's telephone device over a digital portion of said pass-through subscriber's telephone connection; and at said pass-through telephone device, transferring said telephone call over an analog portion of said pass-through subscriber's telephone connection;

wherein said telephone call is switched to said destination party by said analog telephone service provider.

19. A digital telephone device for use by a digital telephone service subscriber, comprising:

a first port configured to connect the digital telephone device to a digital telephone service provider;

a splitter configured to divide said connection with said digital service provider into a digital portion and an analog portion, wherein a telephone call involving the digital telephone device traverses said digital portion in a normal mode of operation;

pass-through means configured to digitally receive a telephone call on said digital channel and pass said telephone call onto said analog channel for transfer to a destination party of said telephone call; and a controller configured to control operation of the digital telephone device.

20. The device of claim 19, further comprising a second port configured to couple a voice communication device to the digital telephone device.

21. The device of claim 20, further comprising a life-line module configured to couple said voice communication device to said analog portion.

22. The device of claim 20, wherein said voice communication device is a handset.

23. The device of claim 20, wherein said voice communication device is an analog telephone.

24. The device of claim 20, wherein said voice communication device is a computer.

25. The device of claim 19, further comprising a life-line module configured to allow a telephone call to be placed from the device over said analog portion.

26. The device of claim 19, further comprising a data port configured to facilitate transmission and receipt of data communications over said digital portion on behalf of a computing device.

27. The device of claim 19, further comprising a subscriber line interface circuit.

28. The device of claim 19, wherein said pass-through means comprises a digital modem.

29. A distributed system of subscriber telephone gateways for establishing a telephone call between a digital telephone service subscriber and an analog telephone service subscriber, comprising:

a first digital telephone device at a first customer premise receiving digital telephone services over a first telephone connection having a digital channel and an analog channel;

a second digital telephone device at a second customer premise receiving digital telephone services over a second telephone connection having a digital channel and an analog channel; and a call server configured to route calls between digital telephone devices over a digital communication network;

wherein a telephone call from said first customer premise to a destination customer premise of an analog telephone service subscriber is:

received by said call server;

routed to said second digital telephone service over said digital channel of said second telephone connection;

transferred to said analog channel of said second telephone connection; and routed to an analog telephone service provider for completion to said destination customer premise.

* * * * *